(12) United States Patent
Hubbs

(10) Patent No.: US 7,698,826 B2
(45) Date of Patent: Apr. 20, 2010

(54) REFURBISHABLE RETRO-REFLECTIVE PHOTOGRAMMETRIC TARGET

(75) Inventor: William O. Hubbs, Cedar Hill, MO (US)

(73) Assignee: Hubbs Machine & Manufacturing Co., Cedar Hill, MO (US)

( * ) Notice: Subject to any disclaimer, the term of this patent is extended or adjusted under 35 U.S.C. 154(b) by 150 days.

(21) Appl. No.: 12/011,597

(22) Filed: Jan. 28, 2008

(65) Prior Publication Data

US 2008/0192371 A1   Aug. 14, 2008

Related U.S. Application Data

(60) Provisional application No. 60/901,618, filed on Feb. 12, 2007.

(51) Int. Cl.
*G01C 15/02* (2006.01)

(52) U.S. Cl. .......................................................... 33/293
(58) Field of Classification Search ..................... 33/293
See application file for complete search history.

(56) References Cited

U.S. PATENT DOCUMENTS

| | | | |
|---|---|---|---|
| 1,732,822 A | 10/1929 | Wehr et al. | |
| 1,959,090 A | 5/1934 | Wood | |
| 2,016,333 A | 10/1935 | Leeds | |
| 3,017,713 A | 1/1962 | Butler | |
| 4,340,273 A | 7/1982 | Jacks et al. | |
| 4,509,269 A * | 4/1985 | Leitz | 33/293 |
| 4,549,360 A * | 10/1985 | Allen | 33/293 |
| 4,879,815 A * | 11/1989 | Vischer | 33/293 |
| 4,926,563 A * | 5/1990 | Smith | 33/293 |
| 4,964,218 A * | 10/1990 | Morghen | 33/293 |
| 5,073,005 A | 12/1991 | Hubbs | |
| 5,119,564 A * | 6/1992 | Hamilton et al. | 33/293 |
| 6,796,043 B2 * | 9/2004 | Jackson et al. | 33/293 |
| 6,813,840 B1 * | 11/2004 | Delmas et al. | 33/293 |
| 6,901,673 B1 * | 6/2005 | Cobb et al. | 33/502 |
| 7,500,318 B2 * | 3/2009 | Dickinson | 33/293 |

* cited by examiner

*Primary Examiner*—Christopher W Fulton
(74) *Attorney, Agent, or Firm*—Paul M Denk

(57) ABSTRACT

A surveying type target has a precisely located aperture that achieves tolerances, within +/−0.0005 inch, in the assembly and usage of a retro-reflective photogrammetry target for use with close range industrial photogrammetry. The dot the target may also be refurbished and reconditioned in the field under all weather conditions. This target has a precisely machined ring that fits into a precisely machined socket of a body to eliminate assembly irregularities. This target precisely locates the ring upon the body forming a finished target with a known centerline and height location within +/−0.0005 inch tolerance.

10 Claims, 2 Drawing Sheets

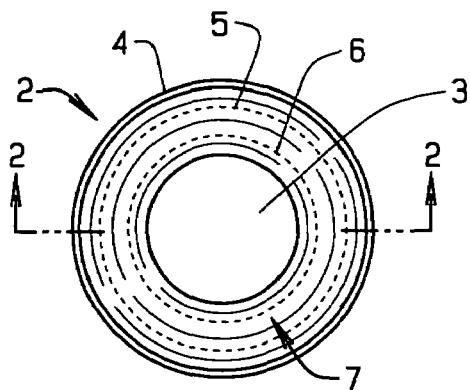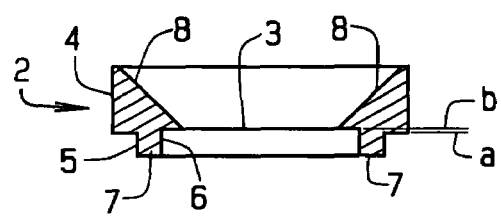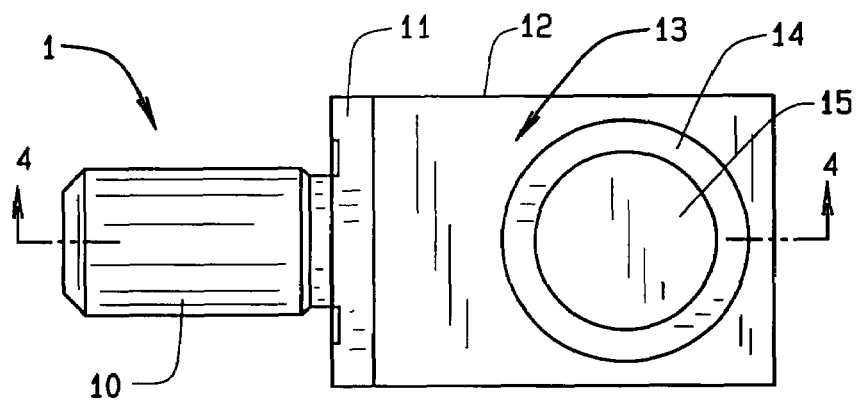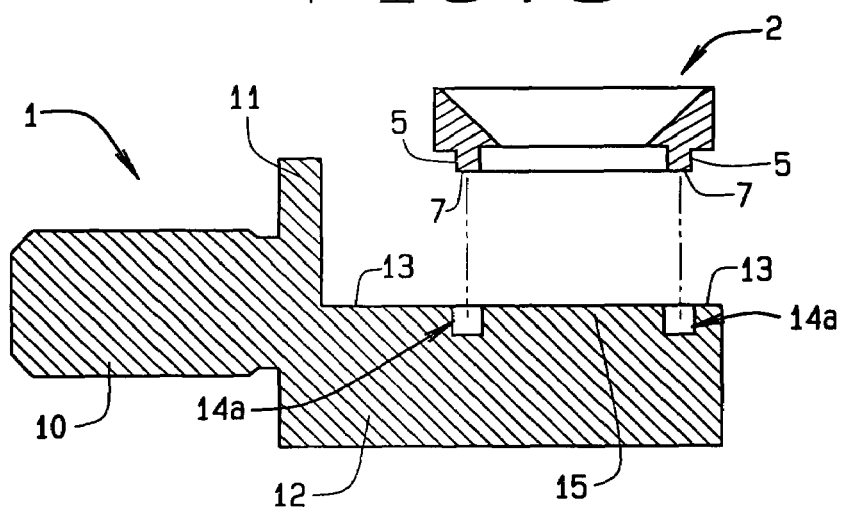

REFURBISHABLE RETRO-REFLECTIVE PHOTOGRAMMETRIC TARGET

CROSS REFERENCE TO RELATED APPLICATION

This provisional application claims priority to the non-provisional patent application Ser. No. 60/901,618, which was filed on Feb. 12, 2007, which claims to the non-provisional application for patent Ser. No. 11/325,972 which was filed on Jan. 4, 2006, which claims priority to the provisional application for patent Ser. No. 60/641,828 which was filed on Jan. 5, 2005 and all are commonly owned by the same inventor. This application is also related to U.S. Pat. No. 5,073,005 commonly owned by the same inventor.

BACKGROUND OF THE INVENTION

This invention relates generally to a target for retro-reflective photogrammetry that provides for critical detection of light from the strobe of a close range industrial photogrammetry camera, and more specifically to a precisely machined aperture ring and cooperating socket that defines a target assembly that provides for precise area and location of the target to within +/−0.0005 inch or less.

Targets with closely located mask overlays, used in photogrammetry and automated theodolite systems, have been available for years in the prior art. Generally, of more current usage, the Global Positioning System, or GPS, is used indoors as a method to precisely set various industrial devices and industrial equipment, including machinery and for close tolerance industrial surveying, as used in manufacturing and assembly operations. Normally, infrared targets without a mask overlay have tolerances within several thousandths of an inch, which may be insufficient to obtain the precision required in a machining operation, in the manufacturing of parts in particular industries, or in industrial surveying. Additionally, laser projection systems emit a laser beam along a line that represents the position of an edge used in a step of manufacturing, such as the position of a composite lay up sheet.

For reference, retro-reflective photo targets, with a mask overlay have had countless design adaptations to enhance precision for the various settings and component features that are measured using close range industrial photogrammetry. These adaptations may include straight holes, threaded holes, surfaces, edges, slots and the like. The prior art frequently obtains tolerances as close as +/−0.0.005 inch. In achieving such tolerances, an adhesive masked overlay is located and inspected with a high degree of precision in the controlled environment of a factory. The factory provides the special tooling and fixtures, inspection masters and equipment, and the trained and highly skilled people that operate the tooling and conduct the inspections. Though tight tolerances are achieved, much skill, equipment, and time are expended in doing so.

Currently, most targets, for the photogrammetric methods and systems, generally use a 3M® type tape material that has small glass beads coated onto its top surface, with a reflective coating on the back side of the beads, and integral with the tape. When the strobe light from the photogrammetric camera fires, it causes the glass beads on the tape to reflect the light and thereby creates spots of light that appear on a photograph. The spots are then measured for three-dimensional locations in the X, Y and Z axes. Other targets, as used in photogrammetry, serve as reference points, without achieving a critical X, Y and Z location. These types of targets may be simply an adhesive strip upon a machine or item to be surveyed. Over time and with usage in field conditions, the retro-reflective tape wears or becomes damaged and its reflectivity diminishes. Diminished tape requires replacement. Much like initial assembly of a target, the tape and any overlays, upon close tolerance hard body targets, are replaced by highly skilled staff at a factory location. Replacing the tape and any overlays on critical targeting in the field jeopardizes the tolerances of any targets.

However, many targets require critical dimensions and are mounted upon a close tolerance steel body that supports the target, generally called hard body targets. The intention is for the retro-reflective target to be located precisely in three dimensions on the body which in turn usually represents an X, Y and Z value of the machine or item being positioned or surveyed. The 3M® retro-reflective material is adhered to a tape product of a known definite thickness, the material being covered with small glass beads of approximately 0.003 inch diameter. This material has a granular appearance similar to that of grit on sandpaper. However, in many inspection and quality control steps and operations, the tolerance of the target dot location must be +/−0.0005 inch or less. As a result, the components of the standard materials without a mask overlay make it impossible to meet the tolerances required.

Other prior art includes products stating a high precision of the target location but only on the centerline of the shank of the target to within 0.001 inch on concentricity or 0.0005 inch on centerline. The height tolerance for the target is 0.005 inch which does not meet the needs of industry. The present invention has a tolerance much tighter than the prior art.

To accomplish the final close tolerance that complies with job requirements, some industries use a mask overlay that is critically located in two directions, and a third critical location is the surface of the 3M® material that adheres to the tape and compensates for the thickness of the material used. The final application of the mask overlay produces an area of reflectivity that is controlled by size, roundness, crispness, clarity and critical location in relation to the target body.

As can be seen in the prior art and in U.S. Pat. No. 5,073, 005, to Hubbs, obtaining greater precision through the usage of a mask overlay, applied over a target, and a mask that may have a reflective member applied under it, can attain precise locations, generally within +/−0.0005 inch tolerance or less. This occurs through the use of a mask that has a finite aperture that allows the entrance of the light from the camera strobe therethrough, and adds precision to the establishment of the X, Y and Z axes when such a surveying instrument, applying photogrammetry, is used.

The present invention uses a precisely machined ring that fits in a slip fit relationship into a precisely machined socket. The socket has an inside circular portion for retro-reflective tape over which fits the machined ring. The resulting target apparent through the ring achieves a tolerance of +/−0.0005 inch along centerline, for concentricity, and for height offset.

The goal of this invention is to produce a retro-reflective photogrammetry target that represents X, Y, Z values within a tolerance of +/−0.0005 where the target can be refurbished in field conditions. The present invention reaches this goal by using a ring and a cooperating socket that frame retro-reflective tape upon a target at precise tolerances. The ring shapes and locates the target precisely to a very critical location. The current design consists of multiple components, most having close tolerance assembly features. The difficulty of manufacturing multiple components with very close tolerances is that variations or tolerances stack up, or accumulate, during assembly of a target which jeopardizes the goal of a final target at a location within a 0.0005 inch or less tolerance.

Further, the replacement of retro-reflective tape requires skilled labor and equipment in a factory setting unlike the prompt repairs often demanded in the field.

SUMMARY OF THE INVENTION

The present invention provides a surveying target with a precisely sized and located aperture. The essence of this invention is to provide a means for achieving very close tolerances, within +/−0.0005 inch in the assembly and usage of a retro-reflective photogrammetry as used with close range industrial photogrammetry. The current invention is designed to provide a precisely machined ring that fits into a precisely machined socket of a target body to allow for refurbishing of the retro-reflective dot, or target, by moderately capable personnel in outdoor, rugged, and all weather conditions, while still maintaining the critical X, Y, Z location of the dot, or target, to within +/−0.0005 inch.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and the scope of the present invention.

It is, therefore, the principle object of this invention is to provide an improvement in the technology of retro-reflective photogrammetry targets to define an area within +/−0.0005 inch which in turn provides a value tolerance of +/−0.0005 inch that can be refurbished by the average rodman or surveyor in field conditions.

Another object of this invention is to provide for ready replacement of reflective tape upon the target body without compromising the area, centerline, and offset height tolerances.

These and other objects may become more apparent to those skilled in the art upon review of the summary of the invention as provided herein, and upon undertaking a study of the description of its preferred embodiment, in view of the drawings.

BRIEF DESCRIPTION OF THE DRAWINGS

In referring to the drawings,

FIG. 1 shows a top view of the ring of the present invention;

FIG. 2 shows a sectional view of the ring;

FIG. 3 describes a top view of the target;

FIG. 4 illustrates a sectional view of the target combined with a ring;

The same reference numerals refer to the same parts throughout the various figures.

DESCRIPTION OF THE PREFERRED EMBODIMENT

Figure 5:
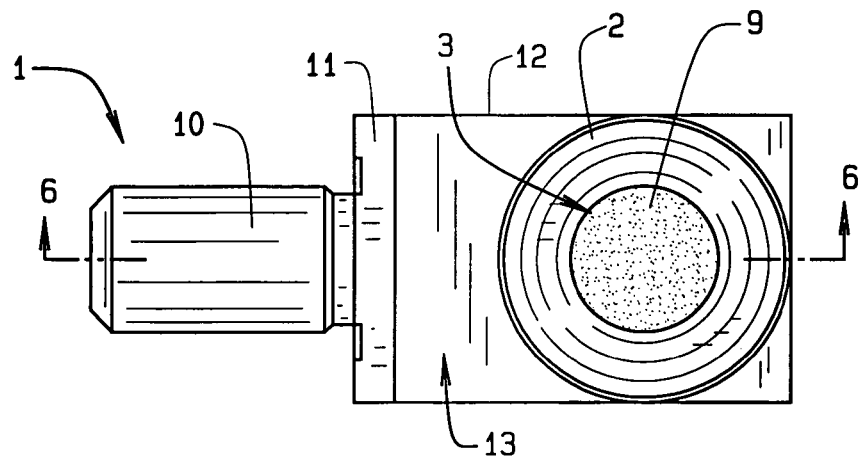
FIG. 5 describes a top view of the target with the ring installed thereupon.

In referring to the drawings, FIG. 1 shows a ring 2 of the present invention, or target 1. The ring is generally round with a downwardly angled round inside face 8 that opens to a round aperture 3 of a known diameter. In this figure, the ring has an outer rim 4 which is generally the outside diameter of the ring, an inner rim 5 here shown in phantom and of lesser diameter than the outer rim, an inside rim 6 also in phantom and of lesser diameter than the inner rim, and an annulus 7 defined as the band located within the inner rim and the inside rim.

When viewed from the side in FIG. 2, the ring 2 has an upper thickness, a bottom below the surface 8, and with the annulus centered upon the bottom of the ring and outwardly of the aperture. The inside face 8 descends radially from the outer rim towards the aperture, generally at a forty five degree angle or bevel. Proximate the aperture, the inside face is offset 0.005 inch above the annulus where the offset is shown between the lines a, b. The offset allows for the thickness of retro-reflective tape 9 as later shown in FIG. 7. The aperture is also offset 0.005 inch above the bottom of the ring. The offset extends in a horizontal plane outwardly to the inside rim 6. Thus inside of the annulus, the thickness of the ring is generally lessened 0.005 inch. The annulus extends downwardly for its thickness below the remainder of the ring. As before, the annulus is centered upon the ring and the aperture.

The ring fits within a target 1 as shown in FIG. 3. The target has a generally round shank 10 that is received by various surveying rods, machine sockets, and positioning devices. The centerline of the shank generally passes near the surface of the retro-reflective tape 9 thus defining the plane or surface 13 of the target 1 for use mostly by photogrammetry systems. The shank has one end for insertion, such as into a hole on a large part, and an opposite end that joins to a shoulder 11. The shoulder is part of a body 12 and is generally perpendicular to the body where the body extends away from the shank. In this figure, the body is shown generally rectangular with one lateral end joined to the shoulder and the other lateral end away from the shank. Away from the shoulder, the body has a socket 14 recessed into the surface 13. The socket is round within an outer diameter precisely machined to snugly accept the outer rim of the annulus of the ring. Inside of the socket, the body has a round plate 15 of lesser diameter than the inside rim of the annulus. The surface of the plate is coplanar with the surface 13 of the body in this embodiment. Alternatively, the surface of the plate is lowered 0.005 of an inch below the surface 13 of the body to accommodate the thickness of retro-reflective tape to within a tolerance of +/−0.0005 inch.

In the preferred embodiment, the target 1 assembles as shown in FIG. 4. As described above, the target 1 has a shank 10 to which connects on one end a shoulder 11. The shoulder positions the body 12 so that its surface 13 is coplanar with the centerline of the shank to within 0.005 inch. The body has a socket 14 located away from the shoulder here shown as two parallel spaced apart channels 14a. Within the channels, the body has a plate 15 upon which is later placed the retro-reflective tape 9 as in FIG. 7. Outwardly of the plate, the channels 14a have a precisely machined diameter to accept the outer rim 5 of the annulus 7 snugly, as in a slip fit. The machining of the diameters of the outer rim and the channels keeps the aperture 3 to within +/−0.0005 of an inch tolerance in height from the shoulder and also on the centerline of the shank. For assembly, the ring 2 is positioned with the annulus 7 towards the body 12 and the aperture 3 generally centered upon the plate 15.

The present invention of the target 1 is shown assembled in FIG. 5 from the top. The ring 2 fits its annulus 7 into the socket 14 and comes to rest upon the surface 13 of the body 12. The aperture 3 exposes the retro-reflective tape 9 for usage with signal generating surveying equipment. The aperture provides the center of the retro-reflective tape to within +/−0.0005 of an inch of the centerline of the target and to within +/−0.0005 of an inch of the height of the shoulder, allowing a close tolerance in both directions.

Figure 6:
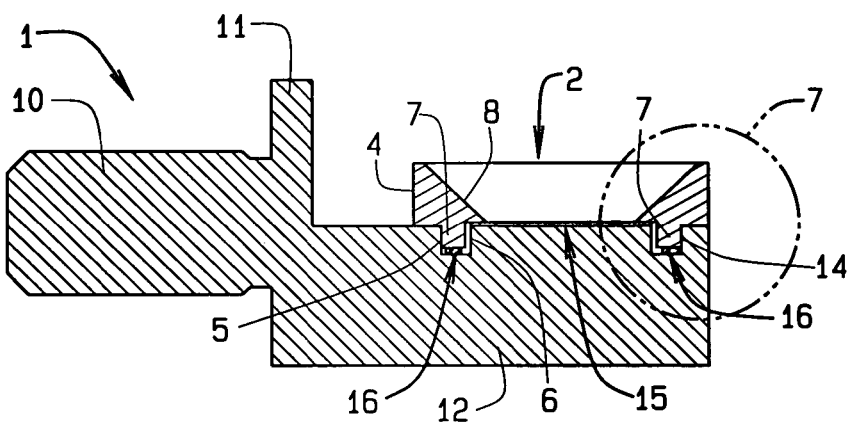
FIG. 6 shows a sectional view of the target of FIG. 5.
Figure 7:
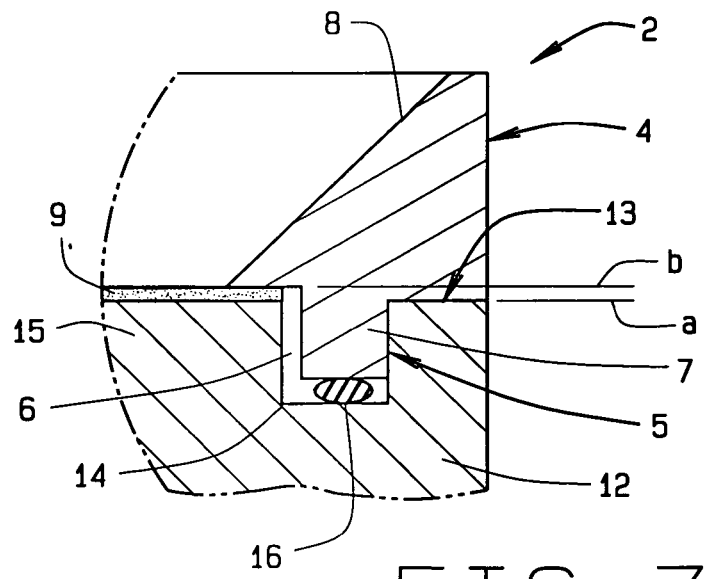
FIG. 7 shows a detail view of the joint of the ring to the target.

The fit of the ring 2 upon the target 1 appears more clearly in FIGS. 6, 7. FIG. 6 shows the ring installed upon the surface 13 of the target. As earlier shown in FIG. 4, the ring approaches the body with the annulus 7 oriented towards the socket 14. When installed upon the body, the ring, on its bottom, rests upon the surface and the plate while the annulus extends into the socket. In this sectional view, the annulus occupies two channels and rests upon a bead of sealant 16, preferably an epoxy, located in the bottom of the socket. The amount of sealant has an upper limit to prevent the ring from rising out of the socket and throwing off the location tolerance of the target. The outer rim 5 of the annulus fits snugly to the outer diameter of the socket. The tolerances of the outer rim and outer diameter of the socket permit a slip fit between the annulus and the body. The inside rim of the annulus is slightly larger than the diameter of the plate. The plate 15 provides a surface for attachment of the retro-reflective tape 9. The tape is readily replaced, even in field conditions, by removing the ring. The target, refurbished with new tape, maintains the tolerances of the aperture when the ring is replaced upon the body. As before, the surface 13 of the body is shown to the side by the line a and the aperture 3 of the ring is shown offset by the line b. The offset accommodates the thickness of the tape 9.

The offset of the aperture and the fit of the annulus to the socket appear with more detail in FIG. 7. The surface of the body in this view follows the line a. The line a indicates the plate and the surface are coplanar and generally the tape 9 attaches upwardly from the surface 13. Typically, the tape and associated glass beads occupy 0.005 inch thickness and the thickness is generally constant from the manufacturing process of the tape supplier. As the tape thickness is known, the aperture of the ring is machined slightly above, 0.005 inch, the bottom of the ring outside of the annulus as shown with line b. With the aperture offset, the ring lies flat upon the surface 13, fits snugly to the outer diameter of the socket, and the thickness of the tape is accommodated.

Looking more closely at the tape 9 in FIG. 7, the tape extends outwardly from the aperture 3 upon the plate 15. Extending the tape beyond the aperture ensures that regardless of the tape placement upon the plate, the entire aperture will be provided with tape as shown in FIG. 5. An aperture completely showing tape provides for proper reflectivity of the target. The plate though extends away from the surface 13 towards the body 12 to form a channel of the socket 14. The thickness of the plate corresponds to the depth of the channel and is slightly more than the height of the annulus. The gap between the depth of the channel and the height of the annulus provides space for bonding, or epoxy 16. As before, the epoxy bonds the ring and prevents contaminants from raising or skewing the annulus when the ring is placed upon the body. Opposite the plate, the socket has its outer diameter that returns to the surface 13 of the body. The annulus has a precisely machined outer rim with a diameter that matches that of the outer diameter of the socket. The annulus meets the bottom of the ring at a ninety degree angle which provides a snug, or slip fit, of the ring upon the body. In this embodiment, the lateral edge of the body opposite the shoulder is generally tangential to the ring and thus the ring is flush with the end of the body. In the present invention, the center of the aperture is within +/−0.0005 inch of the centerline of the body and +/−0.0005 inch accuracy of the height from the shoulder.

Variations or modifications to the subject matter of this development may occur to those skilled in the art upon review of the invention as described herein. Such variations, if within the spirit of this development, are intended to be encompassed within the scope of the invention as explained. The description of the preferred embodiment and as shown in the drawings, are set forth for illustrative purposes only to show the principle of this refurbishable retro-reflective photogrammetric target that allows for replacement of tape while maintaining positional tolerances.

I claim:

1. A device for reflecting light, such as strobe from a camera for photogrammetry, comprising:

a target having a shank, a body generally centered up on said shank, a ring precisely located upon said body and retro-reflective tape;

said ring having an aperture, said aperture locating upon said retro-reflective tape placed upon said body and positioning within +/−0.0005 inch of the centerline of said target and within +/−0.0005 inch of the height of said target;

said body having a shoulder extending perpendicular to said body forming said body into a generally L shape, said shoulder being centered upon said shank;

said body having a surface coplanar with the centerline of said target and generally perpendicular to said shoulder, and extending away from said shoulder and said shank;

said body having a precisely located socket extending into said surface, said socket having an outer diameter, a depth, and; an inner diameter; and a plate formed coplanar with said surface and within said socket, said plate receiving said retro-reflective tape.

2. The reflective device of claim 1 further comprising:

said ring having a generally round shape, a bottom, an outer diameter, and said aperture being centered and slightly above said bottom;

an annulus extending away from said bottom, having an outer rim of lesser diameter than said outer diameter and said outer rim providing a snug fit of said annulus into said socket, an inside rim of greater diameter than said plate and said aperture.

3. The reflective device of claim 2 further comprising:

said ring having a bevel extending outwardly from said aperture and away from said bottom.

4. The reflective device of claim 2 further comprising:

said being offset from said bottom to accommodate the thickness of said retro-reflective tape.

5. The reflective device of claim 4 wherein said aperture is offset 0.005 inch, with a tolerance of +/−0.0005 inch.

6. The reflective device of claim 2 further comprising:

said annulus having a shape in cross section cooperating with the shape of said socket in cross section.

7. The reflective device of claim 6 wherein said annulus has a generally round shape and said socket has a round shape.

8. The reflective device of claim 2 further comprising:

bonding placed within said socket generally below said surface and engaging said annulus.

9. A device for reflecting light from a camera strobe, including retro-reflective tape upon said device, further comprising:

a target supporting said retro-reflective tape, said target providing its location to within tolerances of +/−0.0005 inch of its centerline and +/−0.0005 of its height; and said retro-reflective tape being removable and replaceable while said target maintains its location within said tolerances said target having a shank, a body generally centered upon said shank, and a ring precisely located upon said body;

said ring having a generally round shape, a bottom, an outer diameter, and an aperture being centered and slightly above said bottom, said aperture locating over said retro-reflective tape, and being offset from said bottom to accommodate the thickness of said retro-reflective tape;

said body having a surface coplanar with the centerline of said target and extending away from said shank;

said body having a precisely located socket into said surface, said socket having an outer diameter, a depth, and an inner diameter;

a plate formed coplanar with said surface and within said socket, said plate receiving said retro-reflective tape; and, an annulus extending away from said bottom, having an outer rim of lesser diameter than said outer diameter and said outer rim provides a slip fit of said annulus into said socket, and an inside rim of greater diameter than said plate and said aperture.

10. The reflective device of claim 9 wherein said aperature is offset 0.005 inch +/−0.0005 inch above said bottom and said aperature is within +/−0.0005 inch of the centerline and the height of said target.

* * * * *